Patented Dec. 16, 1952

2,622,086

UNITED STATES PATENT OFFICE 2,622,086

PREPARATION OF 1,2,3-SUBSTITUTED PYRAZOLONE DERIVATIVES

Jules Henri Theophile Ledrut, Brussels, Belgium, assignor to Heyden Pharmacal Company, New York, N. Y., a corporation of Delaware No Drawing. Application January 10, 1949, Serial No. 70,153. In Belgium January 10, 1948

9 Claims. (Cl. 260—310)

My invention relates to the preparation of 1, 2, 3-substituted pyrazolone aldehydes and the products obtained thereby.

The object of my invention is to obtain products of the above character in an advantageous manner.

This invention is concerned with a method of preparing 1,2,3-substituted pyrazoline aldehydes having the general formula

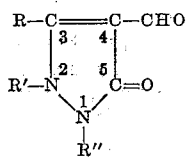

in which R,R', and R'' represent, respectively, alkyl or aryl groups and the products thus obtained.

According to the process a 1,2,3-substituted derivative of 4-($\beta,\beta,\beta$-trihalogen-$\alpha$-R''''-oxyethyl)-5-pyrazolone having the general formula

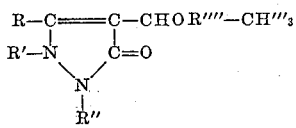

in which R,R', and R'' are, respectively, alkyl or aryl groups, R''' a bromine or chlorine atom, and R'''' a hydrogen atom or an acyl group, may be decomposed by being heated to its boiling point in the presence of potassium carbonate or any other similar alkali so as to yield a 1,2,3-substituted pyrazolone aldehyde having the formula

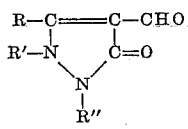

The expression "R''''$\alpha$-oxyethyl" refers to the group

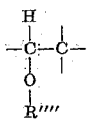

in which R'''' is connected to an oxygen atom which is in turn connected to the $\alpha$ carbon atom of an ethyl group. When R'''' is hydrogen, the expression may be written "$\alpha$-hydroxyethyl" and when R'''' is acetyl, the expression may be written as "$\alpha$-acetoxyethyl."

As the 1,2,3-substituted derivative of 4-($\beta,\beta,\beta$-trihalogen-R''''-oxyethyl)-5-pyrazolone, one may use, for example, 1-phenyl-2,3-dimethyl-4-($\beta,\beta,\beta$-trichloro (or tribromo)-$\alpha$-hydroxyethyl)-5-pyrazolone. In this case the following reaction takes place:

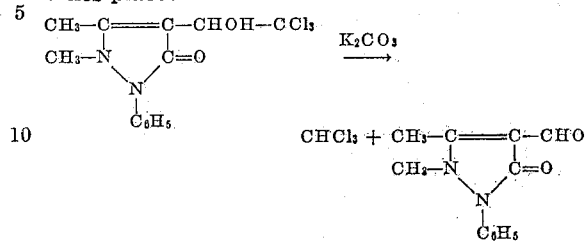

The 1-phenyl-2,3-dimethyl-4-($\beta,\beta,\beta$-trichloro-$\alpha$-hydroxyethyl)-5-pyrazolone used in the above reaction may be obtained by heating 1-phenyl-2,3-dimethyl-5-pyrazolone with chloral hydrate as has been described in the literature by Behal and Choay (Ann. Phys. Chim., 1892, XXXIX, p. 320) and Krey (Thése Iéna, 1892, p. 32).

These compounds, the preparation of which has been referred to above, as well as certain of their derivatives as hereinafter referred to, have been found to possess valuable therapeutic properties. For example, antipyrine-4-aldehyde (1-phenyl-2,3-dimethyl-5-pyrazolone aldehyde) is approximately three times as effective as an antipyretic as is antipyrine.

While my invention is capable of being carried out in many different ways, for the purpose of illustration I have described hereinafter only certain examples thereof.

For example, I may proceed as follows, the parts mentioned being parts by weight:

Example I

Ten parts of 1-p-tolyl-2,3-dimethyl-5-pyrazolone is added to nine parts of chloral hydrate, and the mixture is then heated in an oil bath at 120° C. for about three hours. When cool the resulting solid product is washed three times by slurrying it with boiling water. It is then recrystallized from ethyl alcohol. The yield obtained is 13.5 parts of 1-p-tolyl-2,3-dimethyl-4-($\beta,\beta,\beta$-trichloro-$\alpha$-hydroxyethyl)-5-pyrazolone, having a melting point of 191–192° C. This product contains 30.40% Cl (theoretical amount 30–42%).

To 300 parts of a boiling, concentrated water solution of potassium carbonate is then slowly added 3.5 parts of 1-p-tolyl-2,3-dimethyl-4-($\beta,\beta,\beta$-trichloro-$\alpha$-hydroxyethyl)-5-pyrazolone. This mixture is held at the boiling point and shaken until the evolution of chloroform has ceased. The yield is 23 parts of 1-p-tolyl-2,3- dimethyl-5-pyrazolone aldehyde. On recrystallization from dioxane, $C_4H_8O_2$, the product melted at 166–7° C.

Example II

A mixture of 2.2 parts of 1,3-diphenyl-2-methyl-5-pyrazolone and 1.45 parts of chloral hydrate is heated in an oil bath at 135° C. On cooling the resulting product is washed several times with boiling water and then recrystallized from ethyl alcohol. The yield is 2.6 parts of 1,3-diphenyl - 2 - methyl-4-($\beta,\beta,\beta$-trichloro-$\alpha$-hydroxyethyl)-5-pyrazolone, which has a melting point of 188° C. The product contained 27.1% Cl (theoretical amount—26.8%).

Fifty-five parts of 1,3-diphenyl-2-methyl-4-($\beta,\beta,\beta$-trichloro-$\alpha$-hydroxyethyl)-5-pyrazolone is then mixed with 400 parts of a saturated potassium carbonate water solution, and the mixture is boiled and agitated until substantially all of the chloroform has been given off. The yield is 37 parts of crude product. After recrystallization the 1,3-diphenyl-2-methyl-5-pyrazolone aldehyde obtained is a yellow crystalline substance melting at 158–159° C.

Example III

One hundred parts of 1-phenyl-2,3-dimethyl-4 - ($\beta,\beta,\beta$-trichloro-$\alpha$-hydroxyethyl)-5-pyrazolone is poured slowly into 260 parts of a cold, saturated potassium carbonate water solution. The mixture is then boiled and shaken vigorously until chloroform is no longer given off. The yield of crude material after washing with ice water and drying is approximately 95% of the theoretical amount. The 1 - phenyl - 2,3 - dimethyl-5-pyrazolone aldehyde is recrystallized from dioxane and from a mixture containing equal parts of ethyl alcohol and ethyl acetate. The product melts at approximately 160° C. It is soluble in water, alcohol, dioxane, ethyl acetate, and slightly soluble in chloroform, ether, and benzene. Its oxime derivative melts at 220° C., whereas the phenyl hydrazone derivative has a melting point of 255° C.

Example IV

Ten parts of 1-phenyl-2,3-dimethyl-4-($\beta,\beta,\beta$-trichloro-$\alpha$-acetoxyethyl)-5-pyrazolone is poured slowly into 23 parts of a cold, saturated water solution of potassium carbonate. The mixture is boiled and shaken vigorously as long as there is any evolution of chloroform. The product is cooled and then washed with ice water and dried. Recrystallization from dioxane produces three parts of the corresponding desired aldehyde.

Example V

To a cold saturated potassium carbonate water solution is added 1 - phenyl - 2,3 - dimethyl - 4-($\beta,\beta,\beta$ - tribromo-$\alpha$-hydroxyethyl)-5-pyrazolone. The mixture is boiled and shaken vigorously until all of the bromoform has been given off. The product is washed with ice water, dried, and then recrystallized from dioxane.

Example VI

Bromal hydrate is reacted in molecular proportions with 1-phenyl-2,3-dimethyl-5-pyrazolone by heating at 50° C. for one to two hours. The 1-phenyl-2,3-dimethyl-4-($\beta,\beta,\beta$-tribromo-$\alpha$-hydroxyethyl)-5-pyrazolone formed is purified by recrystallization from ethyl ether. This compound is then treated with a potassium carbonate water solution as described above to yield the corresponding desired pyrazolone aldehyde.

While I have described my invention above in detail it will be understood that many changes may be made therein, as to the proportions, temperature, etc., without departing from the spirit of my invention. For instance, in place of a potassium carbonate water solution used in the above examples I may use a water solution in any desired proportions of potassium carbonate and potassium hydroxide, for example containing equal parts of potassium carbonate and potassium hydroxide, to decompose the 1,2,3-trisubstituted-4-($\beta,\beta,\beta$-trihalogen-hydroxyethyl)-5-pyrazolone or the 1,2,3-trisubstituted-4-($\beta,\beta,\beta$-trihalogen - acetoxyethyl)-5-pyrazolone. The presence of KOH tends to increase the rate of reaction. Or, instead, potassium hydroxide, for example a 10% water solution, may be used alone, but in this case the resultant product is not entirely pure, and the yields are lower than those obtained when potassium carbonate alone is used.

I claim:

1. A process for preparing 1,3-diphenyl-2-methyl-5-pyrazolone aldehyde which comprises reacting a 1,2,3-substituted derivative of 4-($\beta,\beta,\beta$-trihalogen-$\alpha$-R''''-oxyethyl)-5-pyrazolone having the general formula

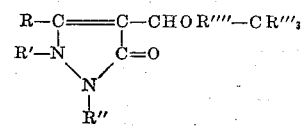

wherein R and R'' are phenyl groups, R' is a methyl group, R''' is a halogen atom, and R'''' is a member selected from the group consisting of hydrogen and acetyl, with an inorganic alkali.

2. A process for preparing 1,3-diphenyl-2-methyl-5-pyrazolone aldehyde which comprises reacting a 1,2,3-substituted derivative of 4-($\beta,\beta,\beta$-trihalogen-$\alpha$-R''''-oxyethyl)-5-pyrazolone having the general formula

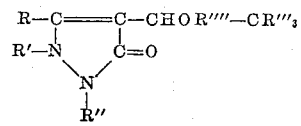

wherein R and R'' are phenyl groups, R' is a methyl group, R''' is a chlorine atom, and R'''' is a member selected from the group consisting of hydrogen and acetyl, with an aqueous solution of potassium carbonate.

3. A process for preparing 1,3-diphenyl-2-methyl-5-pyrazolone aldehyde which comprises reacting a 1,2,3-substituted derivative of 4-($\beta,\beta,\beta$-trihalogen-$\alpha$-R''''-oxyethyl)-5-pyrazolone having the general formula

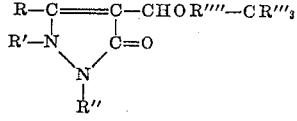

wherein R and R'' are phenyl groups, R' is a methyl group, R''' is a bromine atom, and R'''' is a member selected from the group consisting of hydrogen and acetyl, with an aqueous solution of potassium carbonate.

4. A process for preparing 1,3-diphenyl-2-methyl-5-pyrazolone aldehyde which comprises reacting a 1,2,3-substituted derivative of 4-($\beta,\beta,\beta$-trihalogen-$\alpha$-R''''-oxyethyl)-5-pyrazolone having the general formula

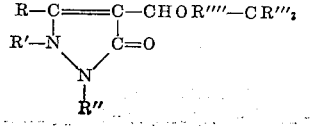

wherein R and R'' are phenyl groups, R' is a methyl group, R''' is a chlorine atom, and R'''' is hydrogen, with an aqueous solution of potassium carbonate.

5. A process for preparing 1,3-diphenyl-2-methyl-5-pyrazolone aldehyde which comprises reacting a 1,2,3-substituted derivative of 4-(β,β,β-trihalogen-α-R''''-oxyethyl)-5-pyrazolone having the general formula

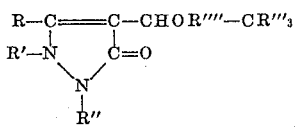

wherein R and R'' are phenyl groups, R' is a methyl group, R''' is a bromine atom, and R'''' is hydrogen, with an aqueous solution of potassium carbonate.

6. A process for preparing 1,3-diphenyl-2-methyl-5-pyrazolone aldehyde which comprises reacting a 1,2,3-substituted derivative of 4-(β,β,β-trihalogen-α-R''''-oxyethyl)-5-pyrazolone having the general formula

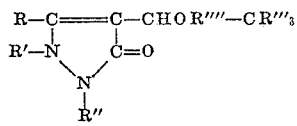

wherein R and R'' are phenyl groups, R' is a methyl group, R''' is a chlorine atom, and R'''' is an acetyl radical, with an aqueous solution of potassium carbonate.

7. A process for preparing 1,3-diphenyl-2-methyl-5-pyrazolone aldehyde which comprises reacting a 1,2,3-substituted derivative of 4-(β,β,β-trihalogen-α-R''''-oxyethyl)-5-pyrazolone having the general formula

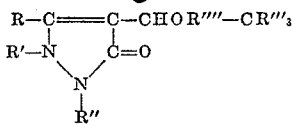

wherein R and R'' are phenyl groups, R' is a methyl group, R''' is a bromine atom, and R'''' is an acetyl radical, with an aqueous solution of potassium carbonate.

8. A process for preparing 1,3-diphenyl-2-methyl-5-pyrazolone aldehyde which comprises reacting a 1,2,3-substituted derivative of 4-(β,β,β-trihalogen-α-R''''-oxyethyl)-5-pyrazolone having the general formula

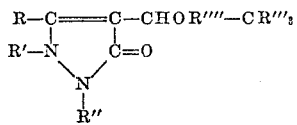

wherein R and R'' are phenyl groups, R' is a methyl group, R''' is a chlorine atom, and R'''' is hydrogen, with an aqueous solution of potassium carbonate, and then recrystallizing the reaction product thus formed to obtain 1,3-diphenyl-2-methyl-5-pyrazolone aldehyde in the form of a yellow crystalline material.

9. 1,3-diphenyl-2-methyl-5-pyrazolone aldehyde.

JULES HENRI THEOPHILE LEDRUT.

REFERENCES CITED

The following references are of record in the file of this patent:

Passerini, Gazz. Chim. Ital., vol. 69, pp. 658 to 664 (1939).
Ridi, Gazz. Chim. Ital., 71, pp. 106–111, (1941).
Ridi, Gazz. Chim. Ital., vol. 77, pp. 3 to 12 (1947).